United States Patent [19]
Smith et al.

[11] Patent Number: 4,835,693
[45] Date of Patent: May 30, 1989

[54] BRAKE ASSURANCE MONITOR

[75] Inventors: Ray Smith, Odessa; Stanley Ladouceur, Kingston, both of Canada

[73] Assignee: UTDC Inc., Kingston, Canada

[21] Appl. No.: 19,285

[22] Filed: Feb. 26, 1987

[51] Int. Cl.⁴ .............................................. B60L 3/00
[52] U.S. Cl. .......................... 364/426.01; 364/426.05; 246/182 B
[58] Field of Search ............... 364/426, 436, 424, 550; 246/182 R, 182 B

[56] References Cited

U.S. PATENT DOCUMENTS

| | | | |
|---|---|---|---|
| 4,015,082 | 3/1977 | Matty et al. | 364/426 |
| 4,015,804 | 4/1977 | Dobler et al. | 364/436 X |
| 4,165,850 | 8/1977 | Dubreucq | 364/426 |
| 4,181,943 | 1/1980 | Mercer et al. | 364/426 |
| 4,208,717 | 6/1980 | Rush | 364/426 |
| 4,209,828 | 6/1980 | Anderson et al. | 364/426 |
| 4,279,395 | 7/1981 | Boggio et al. | 364/426 |
| 4,327,415 | 4/1982 | Rush et al. | 364/436 |
| 4,344,138 | 8/1982 | Frasier | 364/426 |
| 4,402,047 | 8/1983 | Newton et al. | 364/426 |
| 4,538,228 | 8/1985 | Brearey et al. | 364/426 |
| 4,561,057 | 12/1985 | Haley, Jr. et al. | 364/436 |
| 4,562,543 | 12/1985 | Zuber et al. | 364/426 |
| 4,566,067 | 1/1986 | Sahasrabudhe et al. | 364/426 |

Primary Examiner—Parshotam S. Lall
Assistant Examiner—Thomas G. Black
Attorney, Agent, or Firm—Rogers, Bereskin & Parr

[57] ABSTRACT

A brake assurance monitor, for controlling the braking and propulsion systems of a vehicle, has a controller for controlling normal braking, a first level emergency braking and a second level emergency braking. The controller has inlets for connection to lines carrying vital command signals and outlets. A first switch device has inputs for connection to other lines carrying command signals. A number of alternative first inputs and first outputs, which are connectible to the normal or alternative inputs. The outputs are switched from the normal to the alternative inputs by an actuator, controlled by the controller; switching occurs when emergency braking is required. A second switch device similarly has normal, second inputs connected to outlets of the controller, and alternative, second inputs for connection to the lines carrying vital command signals. A second actuator maintains second outputs of the second switch device connected to the normal second inputs during normal braking. When second level emergency braking is required, then the second outputs are connected directly to the vital command lines by connection to the alternative second inputs.

14 Claims, 8 Drawing Sheets

VEHICLE 1

VEHICLE n

COMPARISON LOGIC

BRAKE ASSURANCE MONITOR

FIELD OF THE INVENTION

This invention relates to a braking system for a vehicle. This invention more particularly relates to a braking system for a guided vehicle controlled by a computer on board the vehicle.

BACKGROUND OF THE INVENTION

At the present time, there are a wide variety of braking systems that have been proposed for railroad or other guided vehicles. Most of these known systems operate on an open loop, i.e. there is no feedback of the braking rate which is used to control the braking effort.

An example of a brake control system is found in the Frasier U.S. Pat. No. 4,344,138. This discloses a digital air brake control system. The brake system includes an on-board computer in each car. This computer has stored in it a pressure for the pneumatic braking system, corresponding to a pressure which is 10% below the pressure that would cause the wheels to lock and slide for an empty car. However, the system depends entirely on normal redundancy for safe braking distance. The braking is effectively applied in an open loop. When emergency braking is called for, the computer provides a pressure in the brake cylinder which is 105% of the recorded pressure mentioned previously, i.e. a pressure just below that necessary to cause the wheels of an empty car to lock and slide.

In many conventional railroad braking systems, the service brake is provided with an open loop control, to enable it to be controlled by an operator. Additionally, an emergency brake is provided. The emergency brake is actuated either by the operator, or automatically by signalling, in the event that it is necessary to stop the vehicle in as short a distance as possible.

However, there are some applications for which such a braking system is unsuited. In particular, for Urban Transit systems, such as Intermediate Capacity Transit Systems (ICTS), it is desirable to run the ICTS trains at short headways. Thus, ICTS vehicles produced by the assignee of the present invention employ Linear Induction Motors, which provide a high performance. To make full use of this performance, a high service braking level is used. The service brake provides a constant 1 m/s$^2$ braking rate.

The braking of such an ICTS vehicle is controlled by a Vehicle On Board Computer (VOBC). The VOBC is programmed with a safe stopping distance, which is dependent on the relative levels of the service braking used and emergency braking effort available. To assure a safe stopping distance, a conservative approach is taken when determining the braking available from the emergency braks. Thus, one assumes a heavily laden train, and poor adhesion between the wheels and the rails. A conventional emergency brake is open looped depending only on spring application of disc brakes and the like, and the application of track brakes.

An unfortunate consequence of these operating conditions is the excessive level of emergency braking occurring. Since the level of service braking is high, although always less than the minimum emergency braking available, and since the VOBC assumes a conservative safe stopping distance, emergency braking is called for relatively frequently. This leads to two unacceptable operating conditions. Firstly, emergency braking will often cause the wheels to lock and slide, resulting in wheel flats. At best, this results in noisy vehicle operation, and can require frequent replacement or repair or wheel sets, which is expensive. Secondly, passenger comfort and safety are compromised; excessive acceleration and jerk rates are not acceptable.

SUMMARY OF THE PRESENT INVENTION

Conventional teaching on railway or other guided vehicle braking systems is that the emergency braking must be reliable, and must always automatically be effected when certain conditions are encounterd. To this end, conventional teaching is that any modulation or control of the emergency braking is unacceptable, since errors in such modulation or control could result in inadequate braking.

The present invention is based on the realization that it is indeed possible to modulate the emergency braking, to achieve the desired braking effort. It is further realized that such control of the emergency braking is more feasible than attempting to control the physical characteristics of the disc and track brakes beyond that presently available.

In accordance with the present invention, there is provided a brake assurance monitor, for braking and propulsion systems of a vehicle, the brake assurance monitor comprising:

a controller for controlling three modes of vehicle braking, normal braking, a first level emergency braking, and a second level emergency braking, and which controller has inlets for connection to lines carrying vital command signals and other command signals, and outlets for controlling the vehicle braking and propulsion systems;

a first switch mean comprising a plurality of normal, first inputs for connection to lines carrying non-vital command signals, a plurality of alternative first inputs, for connection to the first level emergency braking command signals and a plurality of first outputs, which are connectible either to respective normal, first inputs or to respective, alternative first inputs;

a first actuation means connected to the controller and the first switch means, for switching the first outputs of the first switch means from the normal, first inputs to the alternative, first inputs, in response to a signal from the controller, wherein the first outputs are connected to the normal, first inputs during normal braking, and are switched to the alternative, first inputs when emergency braking is required;

a second switch means comprising a plurality of normal, second inputs connected to the outlets of the controller, a plurality of alternative, second inputs, connected to the lines carrying the vital command signals, and a plurality of second outputs, which are connectible either to respectivenormal, second inputs or to respective alternative, second inputs; and a second actuation means, connected to the controller and the second switch means, for switching the second outputs of the second switch means from the normal, second inputs to the alternative, second inputs, in response to a signal from the controller, and which second outputs are connected to the normal, second inputs during normal braking and are switched to the alternative, second inputs when the second level emergency braking is required.

The brake assurance monitor thus provides emergency braking at two levels. In the first level emergency braking, the braking can be by means of track brakes and the propulsion system, thus preventing any problem due to wheel flats.

In accordance with another aspect of the present invention, there is provided a brake monitoring method, for a wheeled vehicle having a propulsion system for providing both a propulsive force and a braking force and a braking system including wheel brakes and other brakes, the brake monitoring method comprising, when braking is required:

(a) during braking, achieving the required braking effort by use of both the braking and propulsion systems;

(b) when emergency braking is required, applying a first level emergency braking, in which the other brakes and the propulsion system apply the braking effort, to prevent wheels sliding;

(c) during first level emergency braking, monitoring the braking effort and switching to a second level emergency braking if first level emergency braking is not in accordance with a predetermined stopping performance; and (d) when second level emergency braking is required, applying the braking effort using the propulsion system and the wheel and other brakes.

BRIEF DESCRIPTION OF THE DRAWINGS

For a better understanding of the present invention, and to show more clearly how it may be carried into effect, reference will now be made to the accompanying drawings which show a preferred embodiment of the present invention and in which.

DESCRIPTION OF THE PREFERRED EMBODIMENT

Figure 1:
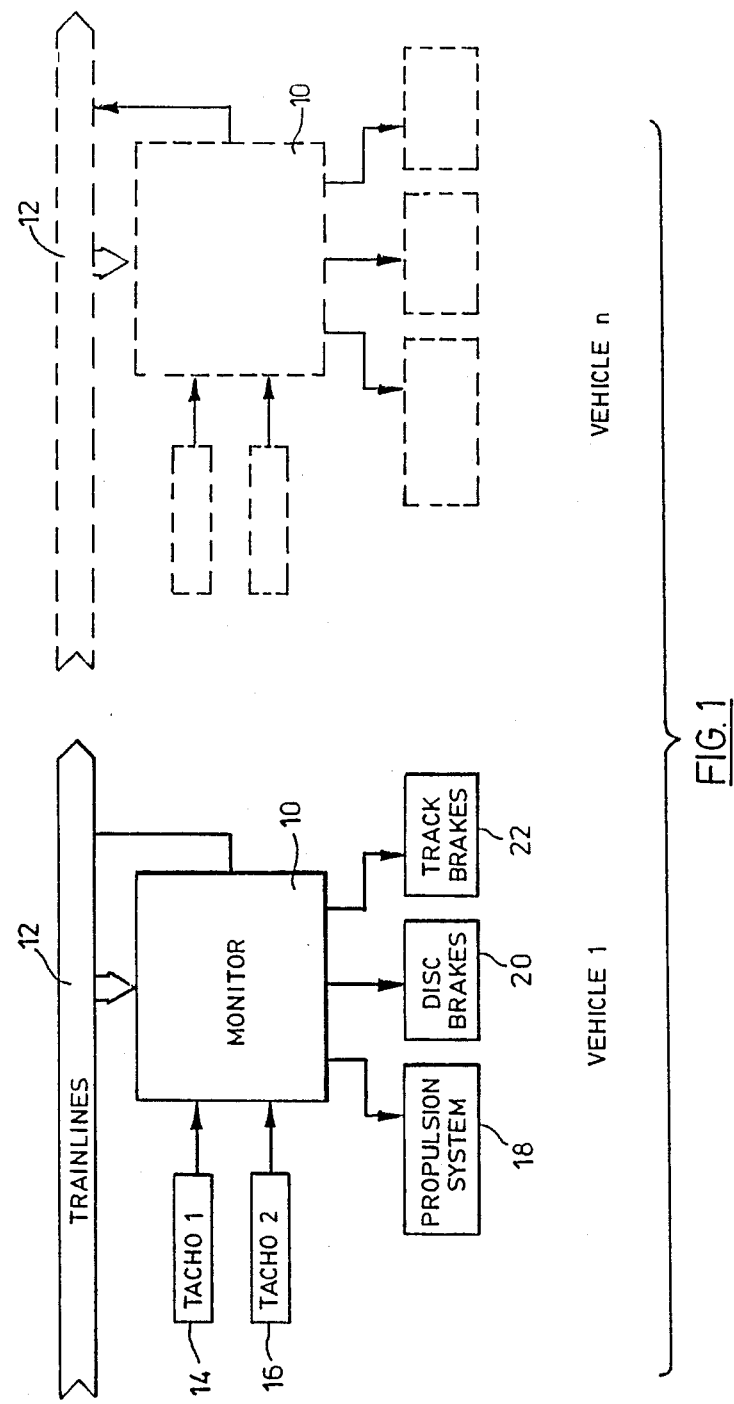
FIG. 1 shows a schematic of a brake assurance monitor according to the present invention.

With reference to FIG. 1, there is shown a brake assurance monitor 10 for a vehicle 1. The brake assurance monitor 10 is connected to trainlines 12, running the length of the train in known manner. These trainlines 12 include command and status lines. There will be one brake assurance monitor 10 for each vehicle, and in the present context a vehicle is defined as a minimum operational unit. Thus, a permanently married pair of cars constitutes a single vehicle. As indicated on the right hand side of FIG. 1, the "nth" vehicle in the train would have its own brake assurance monitor 10. The brake assurance monitor 10 has additional inputs connected to two tachogenerators 14, 16. It also has outputs connected to a vehicle propulsion system 18, disc brakes 20 and track brakes 22., The brake assurance monitor 10 services the normal station stopping functions when an emergency brake trainline is UP, i.e. when emergency braking is not called for. In this normal state, the monitor 10 provides the functions of disabling/enabling the propulsion system and applying/releasing the park brakes. When emergency braking is called for, the monitor 10 switches to level 1 emergency braking, and can then switch to level 2 emergency braking, as detailed below.

Whilst the following description relates to a vehicle employing disc brakes 20, it will be appreciated that the brake assurance monitor 10 could control any suitable brake acting on the wheels.

The first and second tachogenerators 14, 16 are mounted on the separate axles on the vehicle, and will supply data to the brake assurance monitor 10, from which the velocity and acceleration of the vehicle can be determined. This arrangement of two tachogenerators is provided, to detect any discrepancy resulting from one axle becoming locked and sliding, etc.

Figure 2:
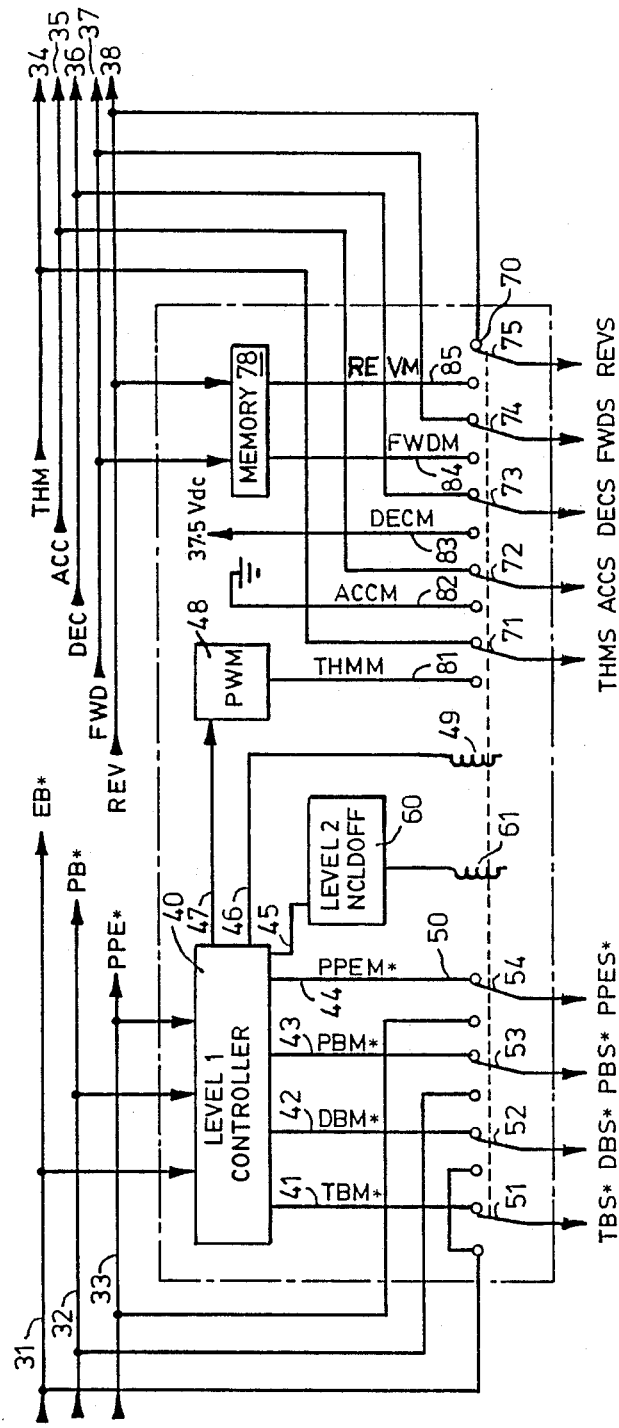
FIG. 2 shows a schematic in greater detail of the brake assurance monitor of FIG. 1.

Referring to FIG. 2, the trainlines 12 are shown in detail, and include eight separate trainlines, numbered 31–38. The eight trainlines 31–38 cover the following eight commands:

| 31 | Emergency brake | EB* |
| 32 | Park brake | PB* |
| 33 | Propulsion power enable | PPE* |
| 34 | Propulsion thrust magnitude | THM |
| 35 | Accelerate | ACC |
| 36 | Decelerate | DEC |
| 37 | Forward drive | FWD |
| 38 | Reverse drive | REV |

Equivalent commands from the monitor are designated with a suffix "M", for example PBM for the park brake signal from the monitor. The emergency brake signal EB is divided by the monitor into separate commands for the track brake TB and disc brake DB.

The commands to the subsystems can originate from either the trainlines or the monitor, and are designated by a suffix "S". The DBS command, the disc brake command to the subsystems, is also fed to the propulsion units, since both the disc brakes and the propulsion units act together in response to emergency brake commands.

The * is used to denote vital commands, and this is detailed below. Vital commands are those that are necessary to ensure safe operation of the vehicle. The remaining trainlines carry non-vital commands. Non-vital commands control the operation of the vehicle under normal conditions. As shown, the vital commands are passed through the monitor 10 to the subsystems in normal operation. As detailed below, the vital commands can be passed directly to the subsystems. Here, the vehicle is operated in an urban transit system in an exclusive right of way.

The two tachogenerators 14, 16 are connected by a screened, four-wire cable supplying two channels in phase-quadrature. The channels are fully isolated from one another, from the vehicle chassis and from the power supply.

All the trainlines 12 are isolated from ground. The vital trainlines 31, 32 and 33 are two-wire circuits and double-cut when disconnected from power.

The brake assurance monitor 10 includes a controller 40, for controlling level 1 braking, as detailed below.

The vital EB, PB and PPE commands on trainlines 31, 32 and 33 are connected to inlets of the controller 40.

The controller 40 has four respective outlets 41, 42, 43 and 44 for the TBM, DBM, PBM and PPEM commands respectively. These outlets 41-44 are connected to a switch unit 50 having corresponding outputs 51, 52, 53 and 54, for connection to the subsystems. Each switch of the switch unit 50 has one, normal input connected to a corresponding outlet of the controller 40, and an alternative input connected to a respective trainline. A level 2 holdoff unit 60 is connected to an output 45 of the controller 40, and is arranged to control the switch unit 50, as indicated schematically by an actuator 61. As shown, with the level 2 holdoff 60 in the UP state, then the outlets 41-44 of the controller 40 are connected to the outputs 51-54 respectively. However, when the level 2 holdoff 60 is DOWN, then the EB trainline 31 is connected to the outputs 51 and 52, and the PB and PPE trainlines 32, 33 are connected to the outputs 53, 54 respectively, via the alternative inputs of the switch unit 50.

The non-vital, or propulsion control commands on the trainlines 34-38 are connected to a switch unit 70. The switch unit 70 includes five respective switches and outputs 71, 72, 73, 74 and 75, for the THM, ACC, DEC, FWD and REV signals respectively. As shown, in a normal state, with the monitor 10 UP, then these switches 71-75 have normal inputs that are connected to the five trainlines 34-38 respectively. Alternative inputs 81-85 are provided for the switches 71-75, these alternative inputs 81-85 being connected to alternative signal sources.

The controller 40 includes an additional output 46 connected to an actuator 49, for controlling the switch unit 70. It also includes an output 47 connected to a pulse width modulation, PWM, unit 48. This unit 48 has an output connected to the alternative input 81 to the switch 71.

For the switch 72, for the acceleration command, the alternative input 82 is connected to ground. For the switch 73, for the deceleration command, the alternative input 83 is connected to a fixed voltage source, here 37.5 volts DC.

For the forward and reverse commands, the two trainlines 37, 38 are connected to a memory 78. This memory 78 has respective outputs connected to the alternative inputs 84, 85 of the switches 74, 75, for providing stored values of the FWD and REV commands.

The switch unit 70 serves as a first switch unit for controlling level 1 emergency braking, whilst the switch unit 50 serves as a second switch unit for controlling level 2 emergency braking.

The brake assurance monitor 10 also includes status outputs connected to fault category #4 (FC4) trainline, and to an onboard health monitor system (HMS). For simplicity, these trainlines are not shown.

In addition to the various inputs and outputs and vital holdoff circuits, the brake assurance monitor 10 includes dual microprocessors and associated hardware and software (not shown in detail). The dual processors operate in a "checked-redundant" mode to meet the "vital" safety requirements. Thus, the inputs from the two tachogenerators 14, 16 are processed independently in a checked-redundant manner by each processor. The derived values of velocity and acceleration are compared by each processor to the results derived by the other processor. If there is any discrepancy, then level 1 emergency braking is set.

The software of the brake assurance monitor 10 is structured to ensure the maximum safety. Thus, for example, the software can be structured in a repetitive cycle with a cycle time less than 100 milliseconds, and each cycle is a one-way flow without loopbacks. Further, to ease checking etc., the software can be of modulator design.

The software has five main application programs, as follows:

(i) Computation of velocity and acceleration;

(ii) Checked-redundant comparison between input data and between processors;

(iii) Servicing normal station-stop functions;

(iv) Monitoring the emergency brake trainline 31, and supervising and controlling level 1 emergency braking; and (v) Generating and supervising the level 2 holdoff, of the level 2 holdoff unit 60.

Figure 3:
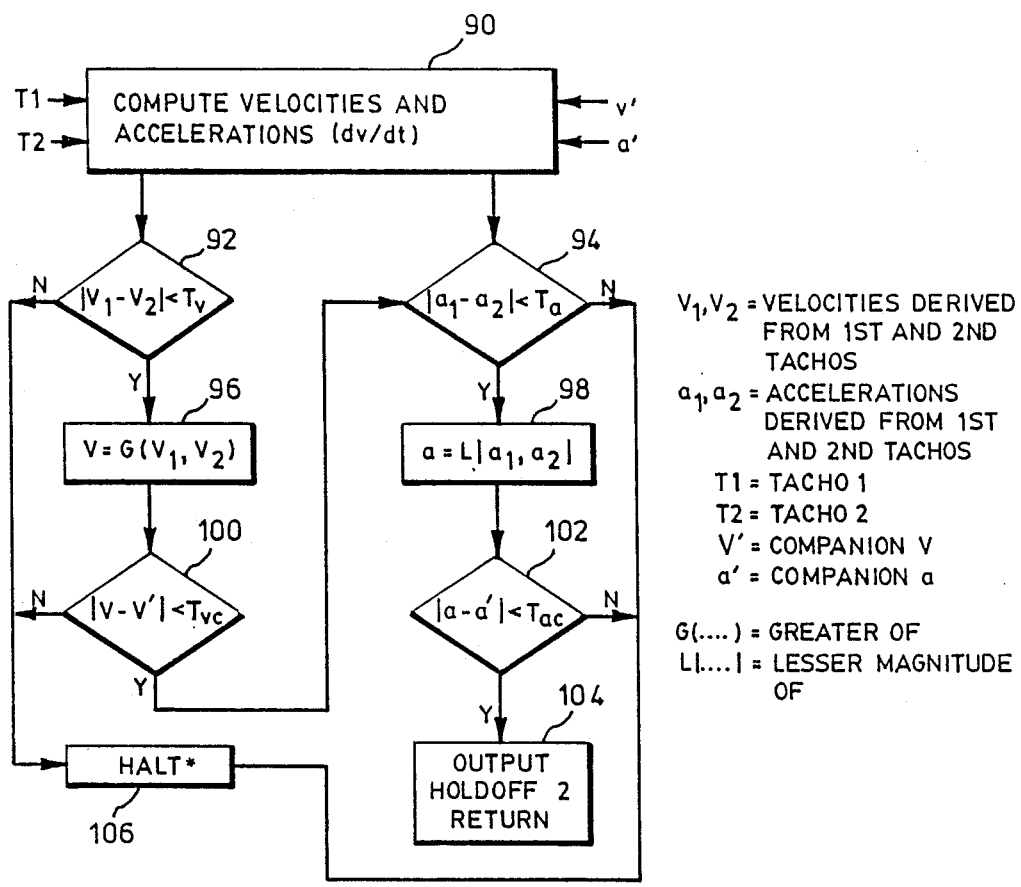
FIG. 3 shows a diagram of logic of the brake assurance monitor of FIGS. 1 and 2.
Figure 4:
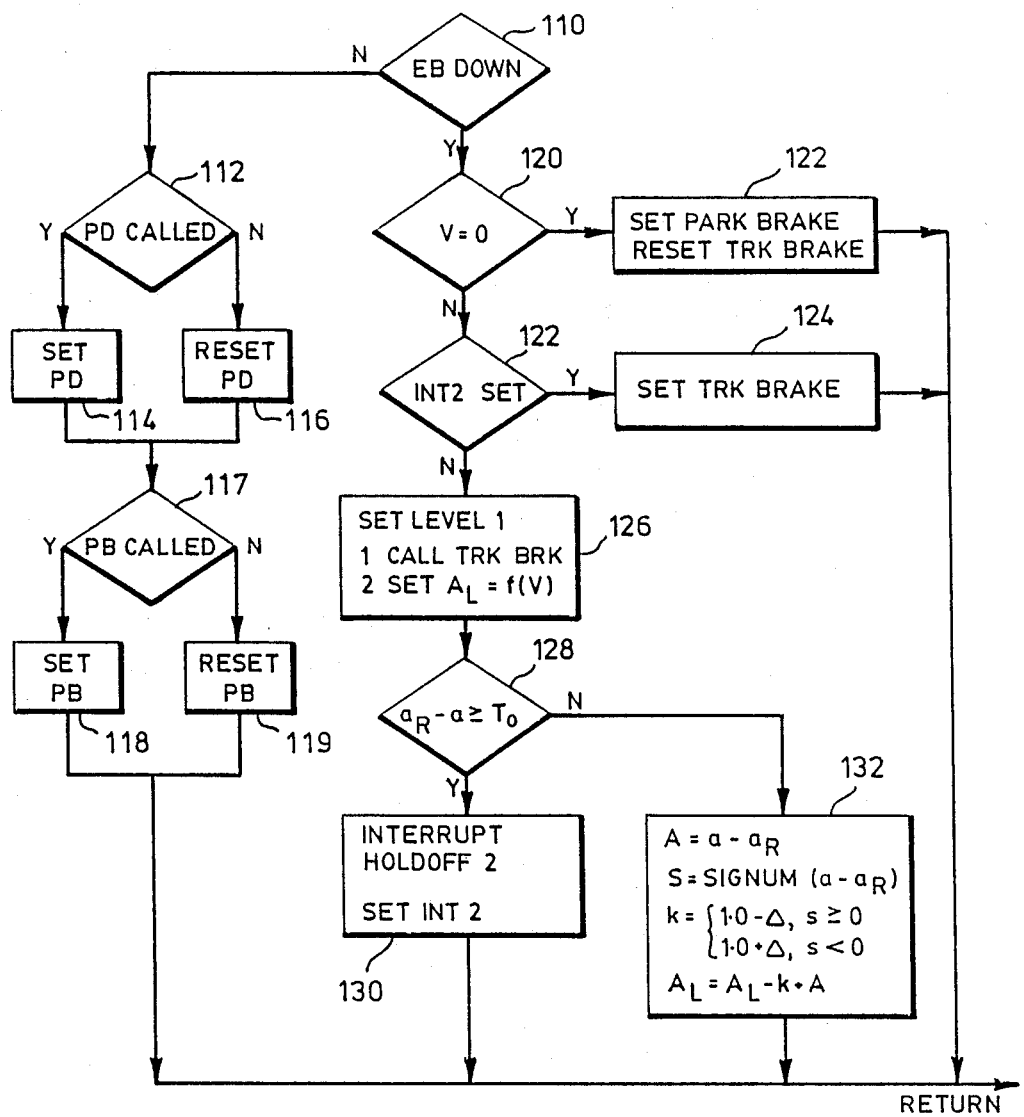
FIG. 4 shows a diagram of further logic used in the brake assurance monitor of FIGS. 1 and 2.

The logic flow charts in FIGS. 3 and 4 show schematiclly these programs. However, it is to be appreciated that these flow charts are only preferred schematics, and that these applications could be carried out in a number of different ways.

With reference to FIG. 3, one of the processors is indicated by a computation block 90. The block 90 has inputs T1, T2, from the tachogenerators 14, 16. It also includes inputs for a companion velocity measurement V' and a companion acceleration measurement a' from the other processor. The computation unit 90 determines velocities $V_1$, $V_2$ from the measurements from the first and second tachogenerators 14, 16 respectively, and determines corresponding accelerations $a_1$, $a_2$.

The velocity measurements are sent to a velocity comparison block 92, whilst the acceleration measurements are sent to a corresponding acceleration comparison block 94.

In the velocity comparison block 92, the magnitude of the difference between the two velocities $V_1$, $V_2$ is compared with a predetermined value $T_v$. If the velocity difference is less than this quantity, then the program proceeds to the next block 96. If the velocity difference is not less than this value, then the program proceeds to a halt block 106.

In the block 96, the velocity "V" is taken as the greater of the calculated velocities, $V_1$, $V_2$, and the calculation proceeds to a second velocity comparison block 100.

Here, the magnitude of the difference between the velocity V and the companion velocity V' is compared to a second preset value $T_{vc}$. Again if the difference in the velocities is not less than the preset value, the program proceeds to the halt block 106, whilst if the velocity difference is less than the preset value, the calculation proceeds to the first acceleration comparison block 94.

Here, as for the first velocity comparison block 92, the magnitude of the difference between the two calculated accelerations $a_1$, $a_2$ is compared with a preset value $T_a$. If this magnitude is less than the preset value, then the calculation proceeds to the next calculation block 98; alternatively, if it is not less than the preset value, then the calculation terminates at the halt block 106.

In the calculation block 98, the lesser of the magnitudes of the two acceleration values $a_1$, $a_2$ is taken as the value for the acceleration "a". The calculation then proceeds to the second acceleration comparison block 102. In this block 102, the magnitude of the difference between the acceleration a and the companion acceleration a' is compared with a second preset acceleration value $T_{ac}$. Again, if this magnitude is less than the preset value, the calculation proceeds to the output block 104. Alternatively, if this magnitude is not less than the preset value $T_{ac}$, then the calculation terminates at the halt block 106.

The output block 104 is connected to the level 2 holdoff unit 60. It maintains the level 2 holdoff unit 60 UP, whilst there is an output. If the calculation sequence terminates at any point at the halt block 106, then there is no output to the block 104. Consequently, the level 2 holdoff becomes DOWN.

The calculation is then repeated for the next set of values.

With reference to FIG. 4, this shows a schematic of the monitoring of the emergency brake. At a first decision block 110, the program determines whether or not the emergency brake trainline 31 is DOWN. If the line is not DOWN, then it proceeds to a second decision block 112. At this second block 112, the program checks to see if propulsion disable, PD, is called for. (Propulsion disable is the reverse of propulsion enable.) If propulsion disable is called for, then propulsion disable is set at unit 114. On the other hand, if propulsion disable is not called for, then the propulsion disable is reset, if necessary, by unit The program then proceeds to a third decision block 117. Here, the program checks to see whether the parking brake has been called for. If the parking brake has been called for, then it is set by a block 118, whereas if no parking brake is called for, then it is reset by unit 119. The program then returns to the beginning.

If the emergency brake trainline 31 is DOWN, then the calculation proceeds to a movement checking block 120. This block 120 checks to see if there is any velocity. If there is no velocity, the program proceeds to the block 122. Here, the park brake is set, and the track brake reset, and the program then returns.

On the other hand, if the block 120 determines that there is some velocity, then it proceeds to the next decision block 122. The block 122 is a level 2 checking block. It checks to see whether level 2 braking, here denoted INT2, has been called for. If level 2 braking is called for, then the program proceeds to the block 124, which sets the track brake, before returning.

On the other hand, if level 2 has not been called for, then the program proceeds to the next actuation block 126. Here, level 1 emergency braking is set. The track brake is called for and the acceleration $A_L$ provided by the linear induction motor is set, as a function of the velocity.

The program then proceeds to an acceleration decision block 128. Here, the difference between the required acceleration $A_R$ and the actual acceleration a is compared to a preset value $T_0$. If this difference is greater than $T_0$, then the program proceeds to an interrupt block 130. Here, the level 2 holdoff 60 is interrupted, causing the braking to switch to level 2 emergency braking. "INT2" is then set.

On the other hand, if the difference between the two accelerations is not greater than the preset value, the program proceeds to a calculation block 132. Here, the quantities indicated in the block on FIG. 4 are assigned the values indicated.

A description will now be given of the mode of operation of the braking system. As indicated above, the braking system operates in one of three different states, namely: normal; level 1 emergency braking; and level 2 emergency braking. The conditions of the emergency brake trainline 1, brake assurance monitor 10 and level 2 holdoff unit 60 for the three states is given by the following Table 1:

TABLE 1

|  | EB TRAINLINE 31 | MONITOR 10 | LEVEL 2 HOLDOFF 60 |
|---|---|---|---|
| 1. Normal | UP | UP or DOWN | UP or DOWN |
| 2. Level 1 EB | DOWN | UP | UP |
| 3. Level 2 EB | DOWN | UP/DOWN | DOWN |

The following Table 2 gives the characteristics of the inputs to the brake assurance monitor, with the exception of the acceleration, deceleration and thrust magnitude inputs. Table 2 gives an indication of the type of input and its condition in the powered state, as follows:

TABLE 2

| MONITOR INPUT COMMANDS | | | |
|---|---|---|---|
| NAME | DESIGNATION | TYPE | POWERED STATE |
| Emergency Brake | EB* | ON/OFF | HOLDOFF |
| Park Brake | PB* | ON/OFF | HOLDOFF |
| Propulsion Power Enable | PPE* | ON/OFF | ENABLE |
| Forward | FWD | ON/OFF | FWD |
| Reverse | REV | ON/OFF | REV |

The following Table 3 gives the condition of all the outputs of the brake assurance monitor 10, for all three states of the braking system:

TABLE 3

| COMMAND OUTPUTS TO SUBSYSTEMS | | | | | | |
|---|---|---|---|---|---|---|
| | | | POWERED | COMMAND STATE | | |
| NAME | DESIGNATION | TYPE | STATE | NORMAL | LEVEL 1 | LEVEL 2 |
| TRACK BRAKE | TBM* | ON/OFF | HOLDOFF | POWERED | UNPR | UNPR |
| DISC BRAKE EB | DBM* | ON/OFF | HOLDOFF | POWERED | POWERED | UNPR |
| PARK BRAKE | PBM* | ON/OFF | HOLDOFF | PR/UNPR | POWERED | POWERED |
| PROPULSION ENABLE | PPEM* | ON/OFF | ENABLE | PR/UNPR | POWERED | UNPR |
| THRUST MAGNITUDE | THMM | PWM | PWM | DISCONNECT | PWM | PREVIOUS (2) |
| ACCELERATE | ACCM | ON/OFF | ACC | DISCONNECT | UPR | PREVIOUS |
| DECELERATE | DECM | ON/OFF | DEC | DISCONNECT | POWERED | PREVIOUS |
| FORWARD | FWDM | ON/OFF | FWD | DISCONNECT | LAST | PREVIOUS |
| REVERSE | REVM | ON/OFF | REV | DISCONNECT | STATE (1) | PREVIOUS |

(1) Supplies command per last valid state on trainlines
(2) Stays connected or disconnected per state on entrance to level 2

In the normal state, as indicated by Table 1, the emergency brake trainline 1 is UP. Note that this normal state is determined solely by the emergency brake trainline, irrespective of the state of the brake assurance monitor 10 or the level 2 holdoff 60.

In the normal mode, the brake assurance monitor 10 enables all the usual service operations to be effected. The failure of the monitor 10 or the loss of its ability to asuare safe braking will not interrupt or interfere with normal operation of the vehicle. The brake assurance monitor 10 is such that failures or dropouts of it do not cause application of the brakes if the emergency brake trainline 31 is UP.

Failure of the brake assurance monitor 10 or loss of its ability to assure safe braking cause both its processors to halt. A processor halt causes the failure category #4 trainline to be set to a fault indication. Simultaneously, a failure indication to the on board health system is sent.

A halted processor can only be reset in the maintenance depot. The reset is such as to prevent inadvertent or unauthorized resetting.

The resetting can be by means of a push button or similar device, which is accessible with the brake assurance monitor 10 mounted in position. It is such as to prevent the reset being effected, if there are any fault in the monitor 10. Resetting will be full and complete; partial or otherwise faulty resets are prevented.

When power is applied to the brake assurance monitor 10 it will automatically re-initialize. It is designed so that momentary interruptions in the power supply, or flicking the power supply on and off, do not cause the monitor to malfunction.

As indicated in Table 3, during normal operation, the track and disc brakes are powered, that is they are held off. The parking brake is powered or unpowered as required.

Similarly, the propulsion enable is enabled, or disabled as required.

The thrust magnitude, acceleration, deceleration, forward and reverse commands are disconnected.

If the brake assurance monitor 10 detects that the emergency brake trainline 31 is DOWN, then it switches to emergency braking at level 1.

During level 1 emergency braking, the monitor 10 supervises the braking effort. A "fail-safe" switch or call to level 2 emergency braking is effected, if the level 1 braking rate is not achieved, or maintained.

During level 1 emergency braking, as shown in Table 1, the monitor 10 and the level 2 holdoff 60 are both UP. All commands to the subsystems are connected to the monitor 10. The actuator 49 is operated, so that the outputs of switches 71-75 are connected to the alternative inputs 81-85 respectively.

During level 1 emergency braking, as shown by Table 3, the track brake is unpowered, so that it is applied. Similarly, the disc brakes and the park brakes, controlled by outputs 52, 53, are powered, which holds them off.

The propulsion enable, on output 54, is powered or enabled. The thrust magnitude at switch 71 is connected to the pulse width magnitude unit 48. The acceleration and deceleration at switches 72 and 73 are unpowered and powered respectively as indicated by the inputs 82, 83. The forward and reverse commands at switches 74, 75 retain their last valid states from memory 78.

Consequently, the drive motors and the track brake apply the braking effort.

At the completion of the emergency braking, when the velocity is approximately zero, the monitor 10 places the vehicle in a parked mode. In this parked mode, the propulsion system is disabled, the parking brake is applied, by the command at output 53, and the track brakes are released by the command at output 51. The parked mode is continuously supervised by the monitor 10. If a motion exceeding one metre is detected by either of its processors while in the parked mode, the monitor immediately reverts to full emergency braking. This is achieved by disabling the propulsion systems and applying both the track and disc brakes.

The monitor 10 is "fail-safe". If it loses the ability to assure safe braking, it automatically switches to level 2 emergency braking, if the emergency brake trainline 31 is down.

The monitor 10 has a "halt" state in which the processors are dead or have ceased functioning. In this state, the monitor 10 has on outputs, and no internal or external action causes an output, except for the prescribed reset and re-initialization process.

The monitor 10 further has a "release" state in which the processors are alive and functioning, but do not control the emergency braking. In the released state, the monitor 10 produces valid data, the processors function correctly and the level 2 holdoff 60 is released. In this state, the monitor 10 places the vehicle in the parked mode at the completion of the emergency braking. After parking, the monitor 10 automatically re-establishes normal functioning on recovery of the emergency brake trainline 31. Recovery of the emergency brake trainline 31 before the vehicle is parked has no effect on the monitor 10. An emergency brake command, i.e. the emergency brake trainline 31 DOWN, subsequent to this automatic resetting of the monitor 10, will result in level 1 emergency braking, unless conditions require a level 2 braking.

The monitor 10 stores and displays on demand the number of times it has gone to the released state. Initialization of this stored data back to zero can only occur on maintenance, by a push button or similar resetting of the monitor 10. This display of the monitor 10 will function in a failed or halted state.

The monitor 10 also includes a failure display, which functions in a failed or halted state. This provides as much information as possible on the condition of the monitor. The failure record is reset, upon maintenance resetting of the monitor 10.

Level 2 emergency braking can be effected with the monitor either UP or DOWN, as indicated in Table 1. In either case, the level 2 holdoff 60 is DOWN. Also, as shown in FIG. 4, emergency braking switches to level 2 if the required acceleration rate is not achieved.

If the monitor 10 is UP at the initiation of level 2 braking, the actuator 61 operates the switch unit 50 so that the four outputs 51, 52, 53 and 54 are connected directly, via the alternative inputs, to the three trainlines 31, 32 and 33. The trainline 31 is connected to both the outputs 51, 52. However, the non-vital commands, at the outputs 71-75 remain connected to the monitor 10.

On the other hand, if the monitor 10 is DOWN during level 2 braking, then the output 71-75 are connected to the alternate inputs 81-85.

During level 2 emergency braking, as shown in Table 3, the track brake and disc brake, subject to the command at outputs 51, 52, are unpowered and applied. The park brake 53 is powered and held off during braking.

The propulsion enable at output 54 is unpowered or disabled.

The outputs 71–75 all remain at their previous states, as they were on entrance to level 2 braking.

At the completion of the level 2 emergency braking, if the monitor is UP, it regains control of the vital commands outputted at 51–54, and places the vehicle in the parked mode.

Reference will now be made to FIGS. 5–8, which show graphs, showing the response of a vehicle equipped with a brake assurance monitor of the present invention.

Figure 5:
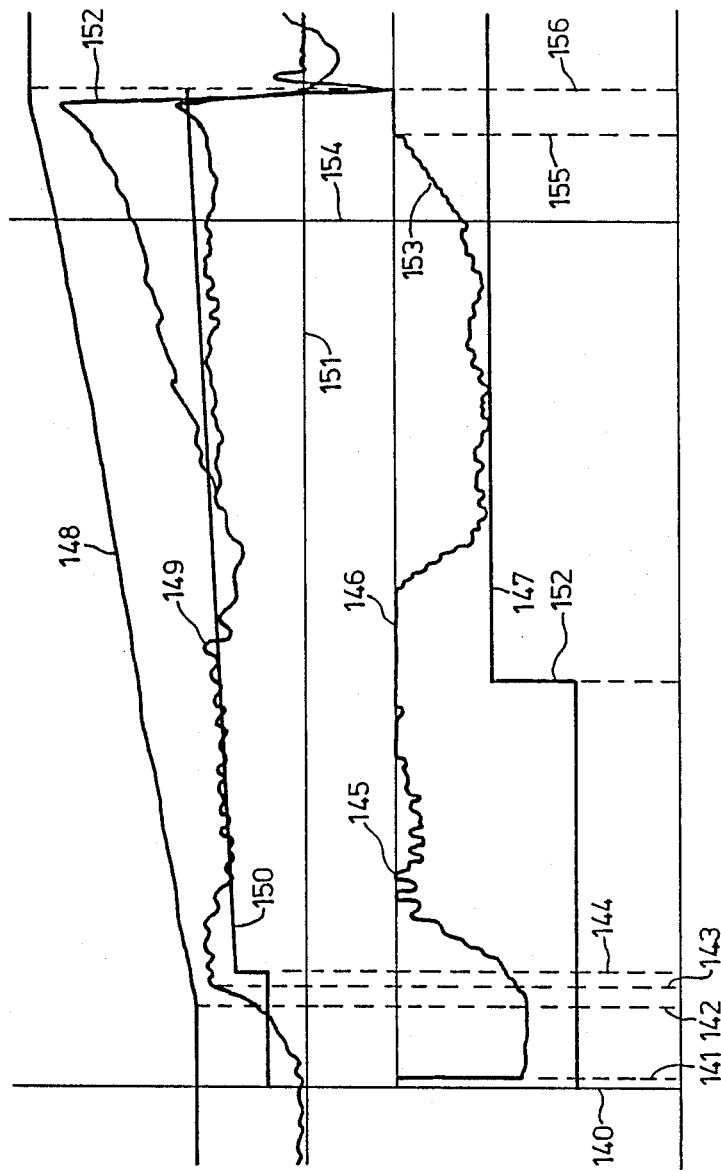
FIG. 5 shows a graph of vehicle behaviour in response to first level emergency braking.

Referring first to FIG. 5, there is shown a graph showing the response of an empty vehicle to first level, or level 1, emergency braking. As on all the graphs, the horizontal axis represents time, whilst the vertical axis shows, in different sections, vehicle velocity, vehicle acceleration, LIM demand and level of track brake application.

The velocity of the vehicle is shown by the line 148. Its acceleration is indicated by the curve 149 and the commanded deceleration or braking effort by the line 150. The lines 149, 150 are with reference to a zero axis 151. A typical, uncontrolled emergency brake response is indicated at 152.

The initial velocity of the vehicle is 80 kilometres per hour.

At the left hand side at 140, the emergency braking is called for. The brake assurance monitor 10, in response to this command, causes the actuator 49 to switch the switches 71–75 to the alternate inputs 81–85. This causes the drive motors, here LIMs, to apply braking effort. The braking effort of the LIM motors is applied at 141. The braking effort of the LIM motors increases from 141 to 142.

As described above, the track brakes are also applied during level 1 emergency braking, and the track brakes engage at 142. From 142 to 143 the braking effort of the track brakes increases to a maximum.

Since it takes some time for the track brakes to engage, a certain time is allowed for them to be applied. Here, the time from 140 to 144 is allowed, and it can be seen that the track brakes engage within this period.

The line 145 shows the degree of deceleration provided by the LIM motors, with 146 representing no output from the LIM motors. Below the line 146 represents deceleration, whilst above the line 146 is acceleration. The level of effort provided by the track brakes is similarly indicated by a line 147.

As can be seen, the acceleration commanded by the line 150, i.e. the emergency brake level called for by the brake assurance monitor 10, commences at one level until time 144, to allow for the track brake delay. It is then increased to a higher level, and increases progressively as the velocity decreases.

Once the track brakes have been applied, after time 144, the total braking effort, indicated by the line 149 is initially greater than that required (line 150). Accordingly, the effort provided by the LIM motors is progressively reduced, as indicated by the line 145, so that the braking effort follows that called for by the line 150. At 152, the braking effort of the LIM motors has been reduced to zero, but the total braking effort is exceeding that called for. Consequently, as shown by the line 147, one of the track brakes is called off, to reduce the track braking effort.

To compensate for this, as shown by the line 146, the LIM braking effort is increased, to maintain the total braking effort close to that called for by line 150. As shown at 153, below a velocity of 3 m/s indicated by line 154, the braking effort of the LIM motors is ramped off, i.e. progressively reduced to zero. Then, by the time 155, the braking effort of the LIMs has been reduced to zero, before the vehicle comes to a stop. The vehicle stops at 156, and the parking brake is then applied.

Thus, as shown, the brake assurance monitor can ensure that the vehicle, and hence the passengers, are never subjected to a deceleration greater than a predetermined maximum. Here, the deceleration rate is maintained less than 2.5 m/s$^2$ during emergency braking. By way of comparison, uncontrolled emergency braking can produce deceleration rates as high as 6 m/s$^2$. This is unacceptable for a passenger carrying vehicle.

Figure 6:
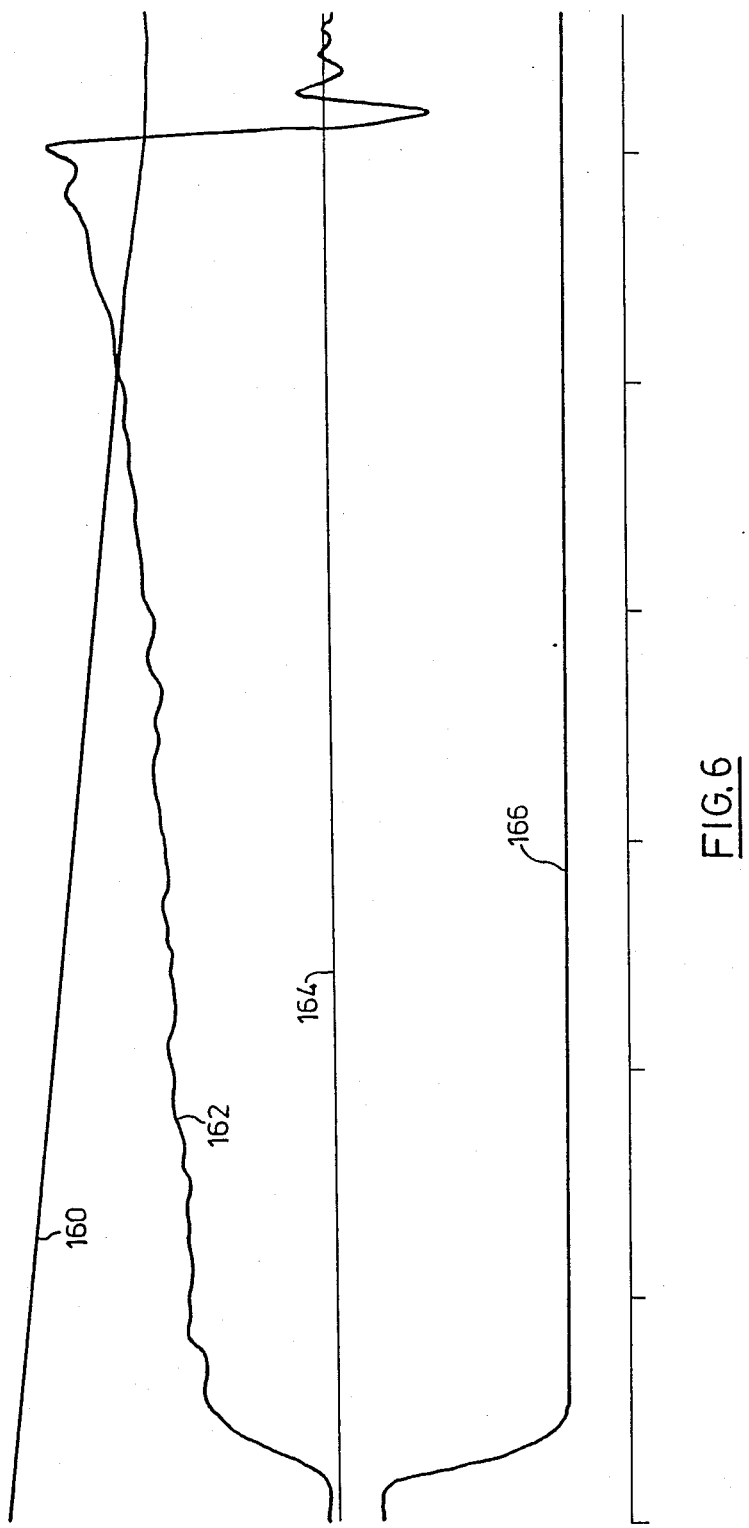
FIG. 6 shows a graph of a typical vehicle behaviour in response to second level emergency braking.

By way of comparison, FIG. 6 shows a typical, level 2 emergency braking. Line 160 indicates the vehicle velocity, which commences at 80 kilometres per hour, with the velocity on the vertical axis reversed from that of FIG. 5. The deceleration rate is indicated by line 162 with reference to a 0 line 164. The disc brake pressure is shown at line 166. Thus, both the track brakes and the disc brakes are applied to give maximum braking effort. As can be seen, the deceleration rate rises rapidly to a value greater than 0.3 g and rises progressively as the velocity decreases. It reaches a peak of 0.64g, i.e. greater than 6 m/s$^2$, just before the vehicle stops.

Figure 7:
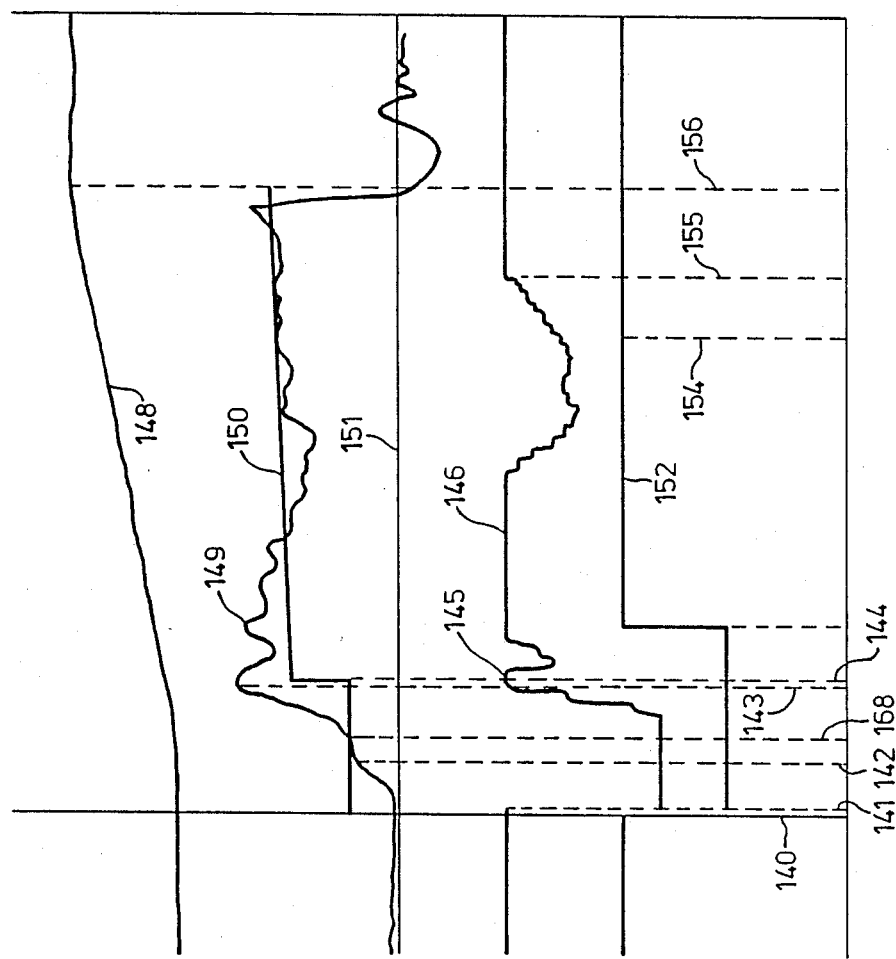
FIG. 7 shows a graph of vehicle behaviour in response to first level emergency braking commencing at low speed.

Reference will now be made to FIG. 7, which shows the behaviour of a vehicle stopping from a relatively low speed of 40 kilometres per hour. It has been found that this presents the most severe control problem. Here, for simplicity, like features of the graph are given the same reference numerals as in FIG. 5. Here again, the emergency brake, at the first level, is called for at 140. At 141, the LIM deceleration is applied, and builds up to a maximum by 142. At 168, the track brakes engage, and the track brake deceleration builds up to a maximum at 143. 144 again is the time delay permitted from the track brake deceleration.

Similarly to FIG. 5, since the total deceleration as indicated at 149 is now greater than 150, the braking effort provided by the LIMs is reduced until it reaches 0. As the braking effort is still too great, the track braking effort is reduced. Then, approximately half way through the braking period, the LIM braking effort is called up again and increased and then decreased, to maintain the braking effort approximate the desired value. Again, when the vehicle velocity is reduced to 3 m/s as indicated by the line 154, the LIM braking effort is ramped off or progressively reduced to zero. The track brakes then bring the vehicle to rest.

Figure 8:
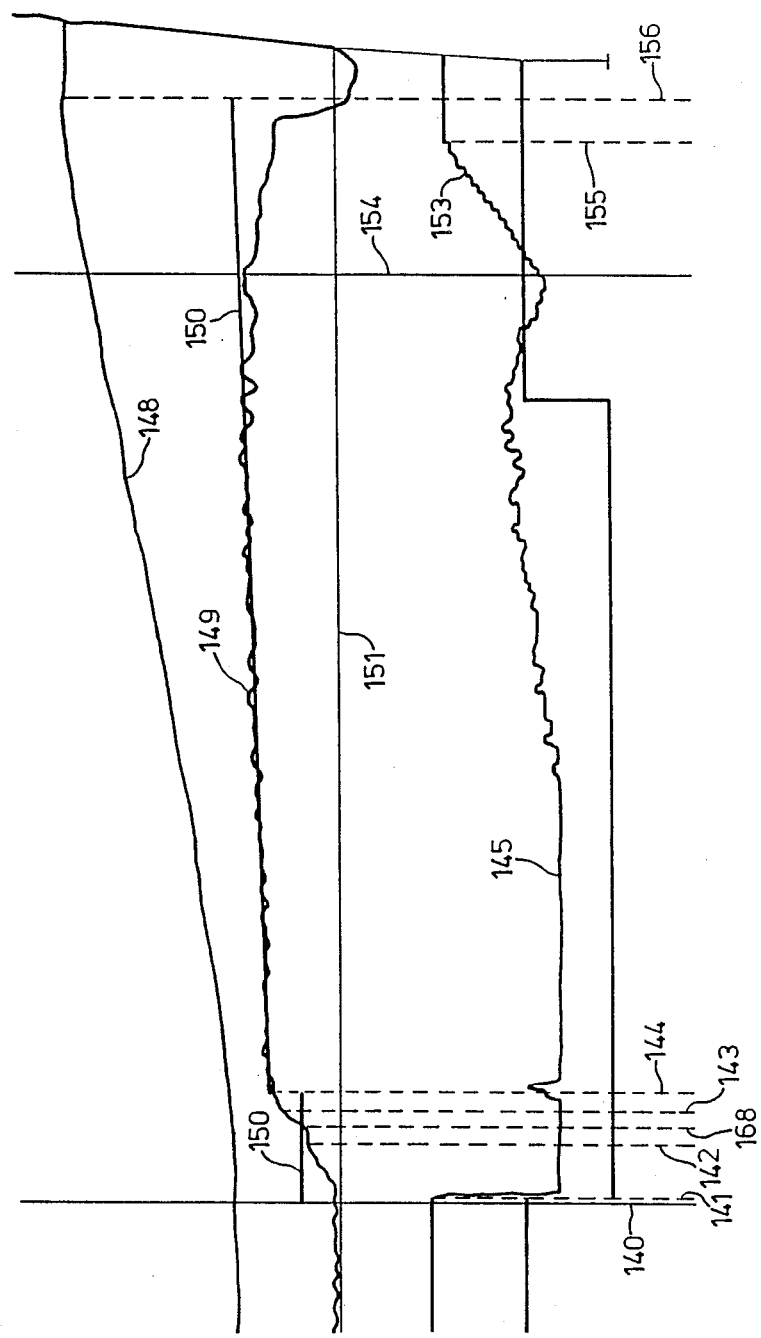
FIG. 8 shows a graph simulating the behaviour of a loaded vehicle in response to first level emergency braking.

Finally, reference will be made to FIG. 8. This is a simulation of a heavily loaded vehicle. This simulation is achieved by only applying half track brakes. The vehicle velocity commences at 80 kilometres per hour. Again, the same reference numerals as used in FIGS. 5 and 7 are employed, for simplicity.

At 140, emergency braking, at level 1, is called for. At 141, again the LIM is demanded to give its full braking capacity, and this is applied by 142. From 168 to 143, the deceleration provided by the track brakes is added. Here, only half the track brakes are applied, to simulate a heavy load. The track brake permitted delay is again indicated at 144.

Because of the reduced track brake effort, the problem of excessive braking does not arise. As indicated, for nearly all the first part of the braking, the LIM is applied at full power. Towards the end of the time, the LIM brake effort is reduced slightly, to maintain the actual braking effort 149 close to the commanded deceleration 150.

Again, when the vehicle speed has reduced to 3 m/s 2 at 154, then the LIM braking effort is ramped or progressively reduced to 0. As shown, the actual deceleration or braking effort 149 to the right of the line 154 is less than that required. This is because with the reduced LIM braking effort, the total braking effort is not quite sufficient to meet the commanded deceleration. The vehicle is then brought to a halt.

It will thus be seen that the brake assurance monitor of the invention enables adequate emergency braking levels to be achieved during the first level emergency braking. This is achieved by using the LIM motor, or other drive motor of the vehicle, together with the track brakes. The disc or other wheel brakes are not used.

For passenger vehicles, this improves passenger safety, and should eliminate, or substantially reduce, injury due to secondary collision resulting from high emergency braking rates. Jerk is eliminated.

The track brake component per vehicle is fully reinstated without reduction in number or modification of the track brakes so that the ultimate second level emergency braking is assured.

The emergency braking system can enable the full vehicle and system performance to be retained, without extending headway, and causing lower capacity in automatic operation.

Since the disc brakes are not used during first level emergency braking, wheel flattening is virtually eliminated. This should result in a quieter ride, whilst reducing maintenance costs.

We claim:

1. A brake assurance monitor, for the braking and propulsion systems of a vehicle, the brake assurance monitor comprising:

a controller for controlling three modes of vehicle braking, normal braking, a first level emergency braking, and a second level emergency braking, and which controller includes inlets for connection to lines carrying vital command signals and outlets for controlling the vehicle braking and propulsion systems;

a first switch means comprising a plurality of normal, first inputs for connection to lines carrying non-vital command signals, a plurality of alternative first inputs for first level emergency braking command signals, and a plurality of first outputs, which are connectible either to respective normal, first inputs or to respective, alternative first inputs;

a first actuation means connected to the controller and the first switch means, for switching the first outputs of the first switch means from the normal, first inputs to the alternative, first inputs, in response to a signal from the controller, wherein the first outputs are connected to the normal, first inputs during normal braking, and are switched to the alternative, first inputs when emergency braking is required;

a second switch means comprising a plurality of normal, second inputs connected to the outlets of the controller, a plurality of alternative, second inputs, for connection to the lines carrying the vital command signals, and a plurality of second outputs, which are connectible either to respective normal, second inputs or to respective alternative, second inputs; and a second actuation means, connected to an outlet of the controller and the second switch means, for switching the second outputs of the second switch means from the normal, second inputs to the alternative, second inputs, in response to a signal from the controller, and which second outputs are connected to the normal, second inputs during normal braking and are switched to the alternative, second inputs when the second level emergency braking is required.

2. A brake assurance monitor as claimed in claim 1, wherein the controller includes at least two independent vehicle motion sensing inputs connected to respective, independent sensing means for sensing the motion of the vehicle, whereby the controller can calculate and compare at least two independent sets of values for the vehicle velocity and acceleration respectively.

3. A brake assurance monitor as claimed in claim 2, which includes two tachogenerators connected to the vehicle motion sensing inputs of the controller.

4. A brake assurance monitor as claimed in claim 2, wherein the controller includes three inlets for connection to lines carrying vital command signals, which vital command signals are an emergency brake signal, a parking brake signal and a propulsion power enable signal.

5. A brake assurance monitor as claimed in claim 4, wherein the controller includes four outlets, for controlling the second level emergency braking, which four outlets are for a track brake signal, a disc brake signal, a parking brake signal, and a propulsion power enable signal, and wherein the second switch means comprises four second switches corresponding to the four outlets of the controller, with each second switch comprising a respective normal, second input, an alternative, second input and a second output, for switching the second output from the respective normal second input to the respective alternative second input, and with the second alternative inputs associated with the second outputs for the track brake and the disc brake signals both being connected to the line carrying the emergency brake signal.

6. A brake assurance monitor as claimed in claim 5, wherein the first switch means includes five first switches corresponding to five lines carrying non-vital command signals, which comprise a thrust magnitude signal, an acceleration signal, a deceleration signal, a forward signal and a reverse signal, and with each first switch having two inputs, a normal first input and an alternative first input, and one first output, and with each normal first input being for connection to the respective non-vital command signal line.

7. A brake assurance monitor as claimed in claim 6, which includes a pulse width modulation unit, which is connected to the alternative, first input of the first switch for connection to the thrust magnitude line.

8. A brake assurance monitor as claimed in claim 7, wherein the alternative first input of the first switch for connection to the acceleration line is connected to ground, and the alternative, first input of the first switch for connection to the deceleration line is connected to a fixed voltage source.

9. A brake assurance monitor as claimed in claim 8, which includes a memory, for providing stored values of the reverse and forward commands, with inputs for connection to the forward and reverse command lines, and outputs connected to the respective alternative inputs of the two first switches, for connection to forward and reverse lines.

10. A brake assurance monitor as claimed in claim 2, 5 or 9, which includes a second level emergency brake holdoff unit, which is connected to the controller, and to the second actuation means.

11. A brake assurance monitor as claimed in claim 2, 5 or 9, which includes a level two holdoff unit connected between the controller and the second actuation means, the holdoff unit normally holding the second actuation means so that the second outputs are connected to the normal second inputs, and in response to controller malfunction, operating the second actuation means so that the second outputs are connected to the alternative second inputs.

12. A brake monitoring method, for a wheeled vehicle having a propulsion system for providing both a propulsive force and a braking force and a braking system including wheel brakes and other brakes, the brake monitoring method comprising, when braking is required:
  (a) during normal braking, achieving the required braking effort using by both the braking and propulsion system;
  (b) when emergency braking is required, applying a first level emergency braking, in which the other brakes and the propulsion system apply the braking effort, to prevent wheels sliding;
  (c) during first level emergency braking, monitoring the braking effort and switching to a second level emergency braking if first level emergency braking is not in accordance with a predetermined stopping performance; and
  (d) when second level emergency braking is required, applying the braking effort using the propulsion system and the wheel and other brakes.

13. A brake monitoring method as claimed in claim 12, including the steps of:
  obtaining from a vehicle motion sensing means at least two independent values of each of the velocity and acceleration of the vehicle;
  comparing the two independent values for each of the velocity and acceleration of the vehicle, and providing an actual value of the velocity and acceleration respectively for the vehicle;
  separately comparing the two independent values of each of the velocity and acceleration of the vehicle to determine a companion velocity value and a companion acceleration value;
  comparing the actual values with the companion values for each of the velocity and acceleration of the vehicle; and
  activating first level emergency as in step (c), if either of the differences between the actual and companion values of the velocity and acceleration exceeds a predetermined amount.

14. A brake monitoring method as claimed in claim 12 or 13, including the steps of:
  monitoring an emergency brake trainline to determine when emergency braking is required, the emergency brake trainline having an up state indicating that emergency braking is not required and a down state indicating that emergency braking is required;
  when the emergency brake trainline is up, generating a propulsion power disable signal if propulsion power disable is requested, and resetting the propulsion power disable signal if propulsion power disable is not requested;
  when the emergency brake trainline is up generating a parking brake signal if parking brake is requested, and resetting the parking brake signal if parking brake is not requested;
  if the emergency brake trainline is down, checking for a vehicle velocity, and generating a parking brake signal and a track brake signal if there is no vehicle velocity;
  in step (b) initiating level one emergency braking, if the emergency brake trainline is down and the vehicle velocity is not zero, by generating a track brake signal and calculating a deceleration signal for the vehicle propulsion system as a function of the vehicle velocity;
  in step (c), monitoring the difference between the actual vehicle acceleration and a predetermined acceleration value, and generating a level two holdoff signal provided that the difference is within a predetermined stopping performance, to hold off level two emergency braking; and
  if a predetermined stopping performance is not met, releasing the level two holdoff to initiate level two emergency braking in step (d).

* * * * *